United States Patent [19]

Kato et al.

[11] Patent Number: 4,578,299

[45] Date of Patent: Mar. 25, 1986

[54] FLEXIBLE MAGNETIC DISK SHEET

[75] Inventors: Mikihiko Kato; Tsutomu Okita; Shigeo Komine; Yasutoshi Okuzawa; Kazuhiko Morita, all of Kanagawa, Japan

[73] Assignee: Fuji Photo Film Co., Ltd., Kanagawa, Japan

[21] Appl. No.: 633,560

[22] Filed: Jul. 23, 1984

[30] Foreign Application Priority Data

Jul. 21, 1983 [JP] Japan .................. 58-133291

[51] Int. Cl.$^4$ .................................. G11B 5/72
[52] U.S. Cl. ........................ 428/65; 360/135;
427/44; 427/54.1; 427/128; 427/131; 428/64;
428/336; 428/137; 428/195; 428/425.9;
428/480; 428/694; 428/695; 428/900
[58] Field of Search ............ 428/695, 694, 425.9,
428/900, 64, 65, 137, 195, 336, 480; 427/44,
54.1, 128, 131; 252/62.54; 360/134-136

[56] References Cited

U.S. PATENT DOCUMENTS

| 3,466,156 | 9/1969 | Peters | 427/132 |
| 3,681,225 | 8/1972 | Genma | 427/132 |
| 4,239,828 | 12/1980 | Knope | 428/421 |
| 4,335,183 | 6/1982 | Hosaka | 428/694 |
| 4,368,239 | 1/1983 | Nakajima | 428/322 |
| 4,387,114 | 6/1983 | Conner | 427/54.1 |
| 4,404,247 | 9/1983 | Dominguez-Burguette | 428/900 |
| 4,434,210 | 2/1984 | Nakajima | 427/44 |

Primary Examiner—Ellis P. Robinson
Attorney, Agent, or Firm—Sughrue, Mion, Zinn, Macpeak, and Seas

[57] ABSTRACT

A flexible magnetic disk sheet is described, including a central circular hole therein, having a protecting layer formed thereon using (a) a compound including one or more atomic group providing lubricity at at least one end of a main chain or a side chain of molecular of the compound and one or more ester bonds of acrylic acid or methacrylic acid at at least one end of a main chain or a side chain of molecule of the compound, and (b) an aromatic ketone, wherein said protective layer is formed on a surface portion surrounding the edge of the central circular hole of a flexible magnetic disk sheet.

28 Claims, 6 Drawing Figures

FLEXIBLE MAGNETIC DISK SHEET

FIELD OF THE INVENTION

The present invention relates to an improvement for flexible magnetic disks. More particularly, it relates to a flexible magnetic disk which can be loaded on writing and/or reading apparatus without eccentricity.

BACKGROUND OF THE INVENTION

Magnetic recording and playing of a magnetic signal in a flexible magnetic disk comprising a sheet in a jacket, involving connecting a sheet-position determining part of a writing and/or reading apparatus to a central circular hole of the jacket and sheet, and rotating the sheet, is known. For the sheet to be stored in the jacket, a space is provided in the magnetic disk which is slightly larger than the sheet, and thus the sheet sometimes moves to an eccentric position in the jacket during use or storage, with the result that the central circular hole of the sheet deviates from the position of a position-determining part (collet) of the apparatus when the disk is loaded on the apparatus, and the sheet may be supported at an eccentric position at the position determining time.

FIG. 1A and FIG. 1B illustrate this type of flexible magnetic sheet, located in a rectangular jacket having circular open part 1a, with circular flexible magnetic sheet 2 having central circular hole 2a thereof in exposed the afore-mentioned central circular open part 1a, said sheet being stored in the jacket to allow free rotation.

Upon loading this flexible magnetic disk on the writing and/or reading apparatus, rotating part 3 (see FIGS. 2-4) of the position-determining part is fitted from under part of the sheet 2, and collet 4 is lowered from upper part of the sheet and is brought into the circular concave part 3a of rotating part 3 as shown in FIG. 2. At this time, the edge of central circular hole 2a does not always correspond to the position of circular concave part 3a of rotating part 3, and is many times out of proper alignment. If collet 4 is lowered in this state, some part of the portion surrounding the edge of circular hole 2a of the sheet 2 may be pinched between collet 4 and concave part 3a of rotating part 3, such that the sheet rotates eccentrically. As writing and reading cannot be carried out correctly unless magnetic disk sheet 2 rotates while being correctly centered corresponding to the central rotating axis, such eccentric pinching should very desirably be prevented. Moreover, there exists another problem, viz., that rattling occurs during rotation due to the absence of planarity of the sheet 2 when it is supported and rotated under such an eccentric pinched state.

Upon connecting the sheet 2 by lowering the collet 4, it is necessary that the portion surrounding the edge of the central circular hole of the sheet possesses an appropriate hardness, and that the friction coefficient ($\mu$) between the sheet 2 and collet 4 as well as between the sheet 2 and rotating part 3 is small, in order that the sheet 2 is loaded correctly as shown in FIG. 4, not as shown in FIG. 3.

For this purpose, a method for reducing the friction coefficient by forming a protecting layer containing a polyolefin material polymerizable with ultraviolet light and an ester of an aliphatic acid on a surface portion surrounding the edge of the central hole of a flexible magnetic sheet where a sheet-position-determining part contacts the sheet is disclosed in U.S. Pat. No. 4,387,114. When lubricant of low molecular weight is employed as described in this method, however, the friction coefficient increases and the effect which prevents eccentric loading decreases under the atmosphere of relatively high temperature of from 40° C. to 50° C. and high humidity of from 70% to 80%. Furthermore, the lubricating effect decreases with repeated loading. The reason of this is probably that lubricant is wiped from the surface during the repeated use.

SUMMARY OF THE INVENTION

The objects of the present invention include providing a flexible magnetic disk which provides for a low friction coefficient between the flexible magnetic disk and a position determining part of a writing and/or reading apparatus, and which can be loaded on the apparatus without eccentricity due to being independent of temperature change, especially with respect to the loss of lubricant even after repeated loading in an atmosphere of high temperature and high humidity.

As a result of intensive studies to achieve the above-mentioned objects, the present inventors found that remarkably favorable results can be obtained by forming a protecting layer using (a) a compound including an atomic group providing lubricity at at least one end of a main chain or a side chain of the molecule, and an ester bond with acrylic acid or methacrylic acid at at least one end of a main chain or a side chain of the molecule, and (b) an aromatic ketone, which acts as an initiator for photo-polymerization by absorbing ultraviolet light, said protecting layer being formed on a surface portion surrounding the edge of a central circular hole of the magnetic disk sheet which contacts with sheet-position determining part. Hardening of the protecting layer is conducted by polymerization by irradiating with ultraviolet light.

Thus, the present invention relates to a flexible magnetic disk sheet including a central circular hole therein, having a protecting layer formed thereon using (a) a compound including an atomic group providing lubricity at at least one end of a main chain or the side chain of molecule, and an ester bond with acrylic acid or methacrylic acid at at least one end of a main chain or a side chain of molecule, and (b) an aromatic ketone, wherein said protecting layer is formed on a surface portion surrounding the edge of the central circular hole of the flexible magnetic disk sheet.

The present invention further relates to a flexible magnetic disk sheet as described above wherein the atomic group providing lubricity is represented by one or more of formula (I), (II), (III), and (IV)

(I) $R^1COO-$, wherein $R^1$ represents a saturated or unsaturated hydrocarbon group of from 5 to 20 carbon atoms, (II) $CF_3(CF_2)_m-$, wherein m represents 0 or an integer of from 1 to 19, (III) $CF_3CFCl(CF_2CFCl)_n-$, wherein n represents 0 or an integer of from 1 to 9, and (IV) $R^2Si(OCH_2CH_2Si)_pO-$, wherein $R^2$ represents a saturated or unsaturated hydrocarbon group of from 1 to 5 carbon atom, and p represents an integer of from 1 to 10.

BRIEF DESCRIPTION OF THE DRAWINGS

In FIGS. 1A through 6, 1 is a jacket, 1a is an open hole in the jacket, 2 is a magnetic sheet, 2a is a central circular hole, 3 is a position-determining part (rotating part), 3a is a circular concave part, 4 is a position-determining part (collet), 10 is a magnetic sheet, 10a is the edge of the central circular hole, 10b and 10b' are surface portions surrounding the edge of the central circular hole, 11 is a protecting layer, and 12 is a slight clearance between the edges of the protecting layers and the edge of the central circular hole.

DETAILED DESCRIPTION OF THE INVENTION

Figure 1A:
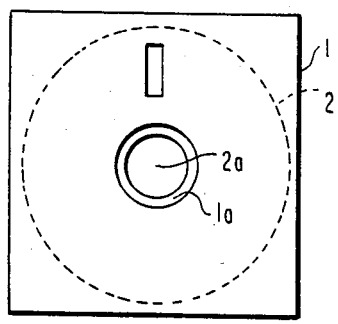
FIG. 1A is planar view showing an example of a flexible magnetic disk according to the invention.
Figure 1B:
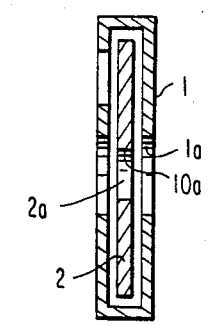
FIG. 1B is its cross-section.
Figure 2:
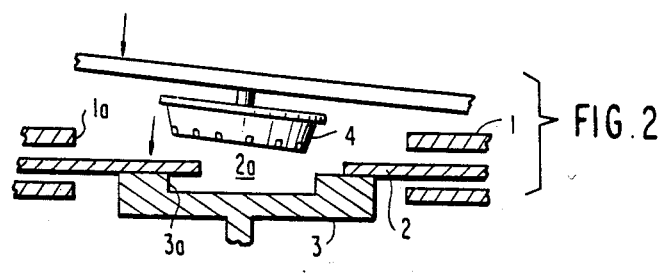
FIG. 2 is a partial cross-sectional view showing the loading of a flexible magnetic disk on a position-determining part of the apparatus.
Figure 3:
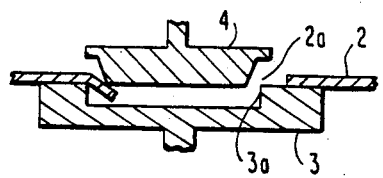
FIG. 3 is a partial cross-sectional view showing a case of loading wherein the sheet is supported eccentrically.
Figure 4:
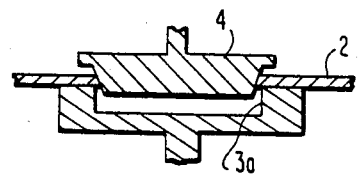
FIG. 4 is a partial cross-sectional view showing a case of loading wherein the sheet is correctly position-determined.

The compound shown as (a) in the present invention includes an atomic group providing lubricity at at least one end of a main chain or a side chain of molecule, and an ester bond of acrylic acid or methacrylic acid at at least one end of a main chain or a side chain. The molecular weight is not limited, and is preferably in the range of from 500 to 30,000. Compound of the region of from oligomer to polymer having a molecular weight range of from 1,000 to 20,000 is more preferable. The skeleton of the main chain is favorably a polyester skeleton, a polyurethane skeleton, a polyether skeleton, a polycarbonate skeleton, a skeleton of epoxy resin, etc. Mixed skeletons of these, or combination of these can be used.

The following are the specific examples of atomic groups providing lubricity.

(I) An atomic group represented by the formula $R^1COO-$ wherein $R^1$ represents a saturated or unsaturated hydrocarbon group of from 5 to 20 carbon atoms, and preferably from 10 to 18 carbon atoms.

(II) An alkyl group substituted by fluorine represented by the formula $CF_3(CF_2)_m-$, wherein m represents 0 or an integer of from 1 to 19, and preferably from 4 to 9.

(III) An alkyl group substituted by fluorine and chlorine represented by the formula $CF_3CFCl(CF_2CFCl)_n-$, wherein n represents 0 or an integer of from 1 to 9, and preferably is from 1 to 4.

(IV) An atomic group represented by the general formula $R^2Si\text{-}(OCH_2CH_2Si\text{-})_pO-$, wherein $R^2$ represents a saturated or unsaturated hydrocarbon group of from 1 to 5, preferably from 1 to 3, carbon atoms, and p represents an integer of from 1 to 10, and preferably from 2 to 6.

The number of the above atomic groups generally ranges from 1 to 30, is preferably from 2 to 20, and more preferably is from 5 to 15, per molecular weight of 1000 of the compound (a).

The number of ester bonds formed at the ends of a main chain or side chains of the molecules is generally from 1 to 10, preferably from 1 to 6, and more favorably from 2 to 4, per molecular weight of 1000 of the compound (a). Esters of stearic acid and a polyurethane acrylate having a hydroxy group at the end of a main chain or a side chain are preferably used.

The compounds (a) having the atomic group (I), (II), (III) or (IV) can be prepared in a conventional manner. Typical preparations of the compounds (a) are shown below:

(i) Preparation of compound (a) having the atomic group (I);

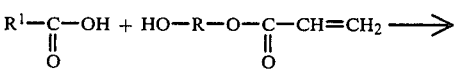

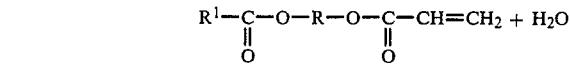

(ii) Preparation of compound (a) having the atomic group (II) or (III);

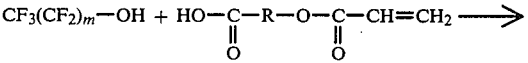

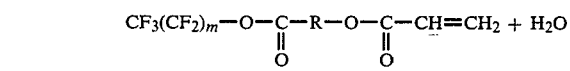

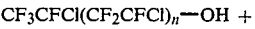

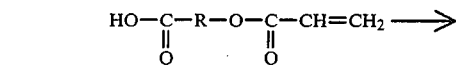

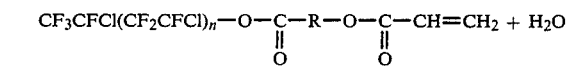

(iii) Preparation of compound (a) having the atomic group (IV);

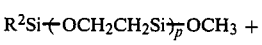

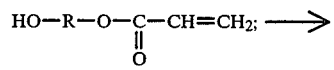

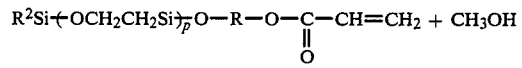

wherein R is the group constituting the main chain of compound (a). The compound (a) having the atomic group and/or the acryl or methacryl at a side chain can be prepared in a similar manner. However, the present invention is not limited to these preparations.

The aromatic ketone that is an initiator of photopolymerization described above as (b) according to the present invention is not particularly limited, although preferred aromatic ketones are those having relatively large absorptivity at wavelengths of 254, 313, and 365 nm, corresponding to the bright line spectra of a mercury lamp, which is typically employed as a light source for ultraviolet light. Typical examples thereof include acetophenone, benzophenone, benzoin ethyl ether, benzyl dimethyl ketal, benzyl ethyl ketal, benzoin isobutyl ketone, hydroxydimethyl phenyl ketone, 1-hydroxycyclohexyl phenyl ketone, 2,2-diethoxyacetophenone, Michler's ketone, etc., and various aromatic ketons can be used. Of these, benzoin ethyl ether, benzyl dimethyl ketal and 1-hydroxycyclohexyl phenyl ketone are particularly preferred.

The relative amount of the aromatic ketone is generally from 0.5 to 20 parts by weight, preferably from 2 to 15 parts by weight, and more preferably from 3 to 10 parts by weight, per 100 parts by weight of the compound (a).

In the case of preparation of a coating solution by mixing afore-mentioned compounds (a) and (b), various organic solvents can be used as the need arises, and in the case that compound (a) is liquid at ambient temperature, the preparation can be conducted using no solvent.

Usable organic solvents include ketones such as acetone, methyl ethyl ketone, methyl isobutyl ketone, cyclohexanone, etc.; alcohols such as methanol, ethanol, propanol, butanol, etc.; esters such as methyl acetate, ethyl acetate, butyl acetate, ethyl lactate, glycol monoethyl ether acetate, etc.; glycol ethers such as ether, glycol dimethyl ether, glycol monoethyl ether, dioxane, etc.; tars (aromatic hydrocarbons) such as benzene, toluene, xylene, etc.; methylene chloride, ethylene chloride, carbon tetrachloride, chloroform, ethylene chlorohydrin, dichlorobenzene, etc.

The coating solution containing the aforementioned compounds (a) and (b) can be coated on the surface portion surrounding the edge of the central circular hole of the flexible magnetic disk sheet in a conventional manner. The coating thickness after hardening by causing polymerization by irradiation with ultraviolet light generally ranges from 1 to 50μ, preferably is from 5 to 30μ, and more preferably is from 10 to 20μ. When the thickness is larger than above range, the so-called track-gap phenomenon may occur. When it is smaller than that range, no sufficient effect results.

The width of the protecting layer may be varied appropriately depending on the size of the disk sheet. For instance, in the case of a 5.25 inch diameter disk sheet, the width of the protecting layer generally is from 2 to 5 mm, preferably is from 2.5 to 3.5 mm, and more preferably is from 2.75 to 3.25 mm. Also preferably, a slight clearance is provided between the edge of the protecting layer and the edge of the central circular hole; this clearance is generally from 15 to 500μ, and preferably from 30 to 350μ, and more preferably from 50 to 200 μ.

The present invention is further illustrated by the non-limiting examples described below.

Figure 5:
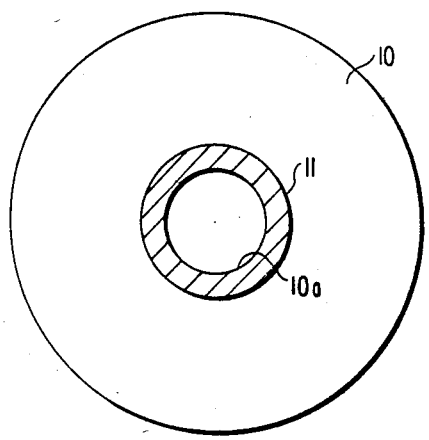
FIG. 5 is planar view showing a sheet part of an example of the invention.
Figure 6:
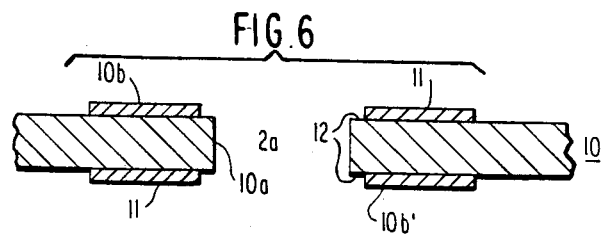
FIG. 6 is a cross-sectional view showing in more detail (not to scale) a preferred sheet part according to the invention, wherein protecting layers are formed on both the upper and lower surface portions surrounding the edge of the central circular hole, with a slight clearance on the surface portions between the edges of the protecting layers and the edge of the central circular portion.

FIGS. 5 and 6 illustrate an example of the present invention. Along the surface portions 10b and 10b' surrounding the edge of central circular hole 10a of flexible magnetic disk sheet 10, a protecting layer 11 of the present invention was applied on both sides of the sheet with a clearance 12 of about 100μ between the edges of the protecting layers and the edge of the central circular hole. The width of the protecting layer was 3 mm. The following shows the compositions of the Examples according to this invention and of the Comparative Example.

EXAMPLE 1

| | |
|---|---|
| Polyurethane acrylate modified by myristic acid (molecular weight: about 7,000) | 100 parts by weight |
| Benzyl dimethyl ketal | 5 parts by weight |

EXAMPLE 2

| | |
|---|---|
| Fluorine substituted alkyl (i.e., $CF_3(CF_2)_7$—) polyurethane acrylate (molecular weight: about 5,000) | 100 parts by weight |
| Benzyl dimethyl ketal | 5 parts by weight |

EXAMPLE 3

| | |
|---|---|
| Polyurethane acrylate modified by $C_2H_5Si$—$(OCH_2CH_2Si$—$)_4O$— (molecular weight: about 5,000) | 100 parts by weight |
| Benzyl dimethyl ketal | 5 parts by weight |

Comparative Example 1

| | |
|---|---|
| Polyurethane acrylate, "M-1100" made by Toa Gosei Co., Ltd. | 100 parts by weight |
| Myristic acid | 5 parts by weight |
| Benzyl dimethyl ketal | 5 parts by weight |

Comparative Example 2

Flexible magnetic disk sheet without protecting layer

Coating solutions consisting of the above-mentioned compositions were prepared and applied to the surface portion surrounding the edge of central circular hole of the flexible magnetic disk sheet so that the amount coated was about 15 g/m², i.e., the coating thickness was about 13μ. Then, the coated sheet was irradiated by means of high pressure mercury lamp of 80 W/cm to polymerize and harden the composites.

The friction coefficient with upper and lower position determining parts in the afore-mentioned Examples and Comparative Examples was measured and loading test on disk drive was conducted under the conditions of 25° C., 80% RH (relative humidity), and 40° C., 80% RH. The results are shown in the Table.

Measurement of the friction coefficient (μ value) was conducted by rubbing the magnetic sheet with position determining part (collet) at a rate of 0.8 mm/sec under the additional weight of a 70 g weight using a strain gauge "UT-IK" made by NMB Co. The friction coefficient with position determining part (rotating part) was measured similarly.

The drives used for loading test on disk drive were YD-280, 380 made by Y-E Data Co., JA 751 and 561 made by Matsushita Tsuko Co. and M-2894 and 4853 made by Mitsubishi Electric Co.

The results are shown by an A for cases in which the disk was correctly loaded on all drives, and by an X for cases in which the disk was uncorrectly loaded on more than one drive upon repeated loadings, i.e., ten times on each drive.

TABLE

|  | 25° C., 80% RH | | | 40° C., 80% RH | | |
| --- | --- | --- | --- | --- | --- | --- |
|  | Friction coefficient ($\mu$) | | | Friction coefficient ($\mu$) | | |
|  | against collet | against rotating part | Loading test on disk drive | against collet | against rotating part | Loading test on disk drive |
| Example 1 | 0.29 | 0.20 | A | 0.30 | 0.23 | A |
| Example 2 | 0.31 | 0.24 | A | 0.32 | 0.28 | A |
| Example 3 | 0.35 | 0.27 | A | 0.38 | 0.30 | A |
| Comparative Example 1 | 0.38 | 0.27 | A | 0.50 | 0.40 | X |
| Comparative Example 2 | 0.55 | 0.32 | X | 0.65 | 0.48 | X |

In Comparative Example 1, a polyurethane acrylate and lubricant typically employed for preparation of magnetic recording media were used and polymerization for hardening was conducted by irradiation of ultraviolet light in the presence of aromatic ketone. The friction coefficient was higher, and inferior results were obtained in such loading test as compared to the friction coefficient obtained in Examples of the present invention. Moreover, the results are dramatically inferior in Comparative Example 2 (without a protecting layer). From these Examples, it is clear that the protecting layer of the present invention keeps the friction coefficient low and results in significant improvement in loading tests.

While the invention has been described in detail and with reference to specific embodiment thereof, it will be apparent to one skilled in the art that various changes and modifications can be made therein without departing from the spirit and scope thereof.

What is claimed is:

1. A flexible magnetic disk sheet including a central circular hole therein, having a protecting layer formed thereon using a composition consisting essentially of (a) a compound including one or more atomic groups providing lubricity at at least one end of a main chain or a side chain of the molecule of the compound and one or more ester bonds of acrylic acid or methacrylic acid at at least one end of a main chain or a side chain of the molecule of the compound, and (b) an aromatic ketone, wherein said protecting layer is formed only on a surface portion surrounding the edge of the central circular hole of the flexible magnetic disk sheet, wherein the relative amount of the aromatic ketone (b) is from 0.5 to 20 parts by weight per 100 parts by weight of the compound (a), said protecting layer being cured by ultraviolet light.

2. A flexible magnetic disk sheet as in claim 1, wherein the atomic group providing lubricity is represented by one or more of formulae (I), (II), (III) and (IV), (I) $R^1COO-$,
wherein $R^1$ represents a saturated or unsaturated hydrocarbon group of from 5 to 20 carbon atoms, (II) $CF_3(CF_2)_m-$,
wherein m represents 0 or an integer of from 1 to 19, (III) $CF_3CFCl(CF_2CFCl)_n-$,
wherein n represents 0 or an integer of from 1 to 9, (IV) $R^2Si+OCH_2CH_2Si)_pO-$,
wherein $R^2$ represents a saturated or unsaturated hydrocarbon group of from 1 to 5 carbon atoms, and p represents an integer of from 1 to 10.

3. A flexible magnetic disk sheet as in claim 1, wherein the number of atomic groups providing lubricity is from 1 to 30, and the number of ester bonds is from 1 to 10, per molecular weight of 1,000 of the compound (a).

4. A flexible magnetic disk sheet as in claim 2, wherein the number of atomic groups providing lubricity is from 1 to 30, and the number of ester bonds is from 1 to 10, per molecular weight of 1,000 of the compound (a).

5. A flexible magnetic disk sheet as in claim 1, wherein the number of atomic groups providing lubricity is from 2 to 20, and the number of ester bonds is from 1 to 6, per molecular weight of 1,000 of the compound (a).

6. A flexible magnetic disk sheet as in claim 2, wherein the number of atomic groups providing lubricity is from 2 to 20, and the number of ester bonds is from 1 to 6, per molecular weight of 1,000 of the compound (a).

7. A flexible magnetic disk sheet as in claim 1, wherein the number of atomic groups providing lubricity is from 5 to 15, and the number of ester bonds is from 2 to 4, per molecular weight of 1,000 of the compound (a).

8. A flexible magnetic disk sheet as in claim 2, wherein the number of atomic groups providing lubricity is from 5 to 15, and the number of ester bonds is from 2 to 4, per molecular weight of 1,000 of the compound (a).

9. A flexible magnetic disk sheet as claimed in claim 2, wherein compound (a) has formula (III).

10. A flexible magnetic disk sheet as claimed in claim 2, wherein compound (a) has formula (IV).

11. A flexible magnetic disk sheet as in claim 1, wherein the relative amount of the aromatic ketone (b) is from 2 to 15 parts by weight per 100 parts by weight of the compound (a).

12. A flexible magnetic disk sheet as in claim 2, wherein the relative amount of the aromatic ketone (b) is from 2 to 15 parts by weight per 100 parts by weight of the compound (a).

13. A flexible magnetic disk sheet as in claim 1, wherein the relative amount of the aromatic ketone (b) is from 3 to 10 parts by weight per 100 parts by weight of the compound (a).

14. A flexible magnetic disk sheet as in claim 2, wherein the relative amount of the aromatic ketone (b) is from 3 to 10 parts by weight per 100 parts by weight of the compound (a).

15. A flexible magnetic disk sheet as in claim 1, wherein the coating thickness of the protecting layer is from 1 to 50$\mu$.

16. A flexible magnetic disk sheet as in claim 2, wherein the coating thickness of the protecting layer is from 1 to 50$\mu$.

17. A flexible magnetic disk sheet as in claim 1, wherein the coating thickness of the protecting layer is from 5 to 30μ.

18. A flexible magnetic disk sheet as in claim 2, wherein the coating thickness of the protecting layer is from 5 to 30μ.

19. A flexible magnetic disk sheet as in claim 1, wherein the coating thickness of the protecting layer is from 10 to 20μ.

20. A flexible magnetic disk sheet as in claim 2, wherein the coating thickness of the protecting layer is from 10 to 20μ.

21. A flexible magnetic disk sheet as claimed in claim 1, wherein the molecular weight of compound (a) is in the range of from 500 to 30,000.

22. A flexible magnetic disk sheet as claimed in claim 2, wherein the molecular weight of compound (a) is in the range of from 500 to 30,000.

23. A flexible magnetic disk sheet as claimed in claim 1, wherein the molecular weight of compound (a) is in the range of 1,000 to 20,000.

24. A flexible magnetic disk sheet as claimed in claim 2, wherein the molecular weight of compound (a) is in the range of 1,000 to 20,000.

25. A flexible magnetic disk sheet as claimed in claim 1, wherein the skeleton of the main chain of compound (a) is selected from the group consisting of a polyester skeleton, a polyurethane skeleton, a polyether skeleton, a polycarbonate skeleton, an epoxy resin skeleton, or a mixed skeleton thereof.

26. A flexible magnetic disk sheet as claimed in claim 2, wherein the skeleton of the main chain of compound (a) is selected from the group consisting of a polyester skeleton, a polyurethane skeleton, a polyether skeleton, polycarbonate skeleton, an epoxy resin skeleton, or a mixed skeleton thereof.

27. A flexible magnetic disk sheet as claimed in claim 2, wherein compound (a) has formula (I).

28. A flexible magnetic disk sheet as claimed in claim 2, wherein compound (a) has formula (II).

* * * * *